United States Patent
Mäder

(10) Patent No.: US 8,378,829 B2
(45) Date of Patent: Feb. 19, 2013

(54) METHOD FOR MONITORING AND/OR CONTROLLING A TRANSPORT DEVICE, TRANSPORT DEVICE FOR CARRYING OUT SAID METHOD AND CLAMP FOR DETACHABLY HOLDING AND TRANSPORTING

(75) Inventor: Carl Conrad Mäder, Hinwil (CH)

(73) Assignee: Ferag AG, Hinwil (CH)

(*) Notice: Subject to any disclaimer, the term of this patent is extended or adjusted under 35 U.S.C. 154(b) by 491 days.

(21) Appl. No.: 12/451,618

(22) PCT Filed: May 11, 2008

(86) PCT No.: PCT/CH2008/000103
§ 371 (c)(1),
(2), (4) Date: Nov. 20, 2009

(87) PCT Pub. No.: WO2008/144945
PCT Pub. Date: Dec. 4, 2008

(65) Prior Publication Data
US 2010/0134253 A1 Jun. 3, 2010

(30) Foreign Application Priority Data
May 29, 2007 (CH) .......................... 853/07

(51) Int. Cl.
*G08B 13/14* (2006.01)
*B65G 47/84* (2006.01)
*B65G 47/86* (2006.01)

(52) U.S. Cl. ................ 340/572.8; 340/10.1; 340/572.1; 198/470.1; 209/900

(58) Field of Classification Search ............... 340/10.1, 340/572.1, 572.8; 198/470.1; 209/900
See application file for complete search history.

(56) References Cited

U.S. PATENT DOCUMENTS

| | | | |
|---|---|---|---|
| 5,575,379 A * | 11/1996 | Schmetzer ................. | 198/803.9 |
| 6,452,497 B1 | 9/2002 | Finlayson | |
| 7,118,029 B2 | 10/2006 | Nyez et al. | |
| 7,159,772 B2 | 1/2007 | Berg | |
| 2004/0102870 A1 | 5/2004 | Andersen et al. | |
| 2007/0080783 A1* | 4/2007 | Ghosh et al. ................. | 340/10.1 |
| 2007/0194921 A1* | 8/2007 | Watanabe et al. .......... | 340/572.1 |
| 2007/0210923 A1* | 9/2007 | Butler et al. ............... | 340/572.8 |

(Continued)

FOREIGN PATENT DOCUMENTS

| | | |
|---|---|---|
| DE | 196 23 307 A1 | 1/1997 |
| EP | 0 518 064 A1 | 12/1992 |

(Continued)

*Primary Examiner* — Jennifer Mehmood
*Assistant Examiner* — Andrew Bee
(74) *Attorney, Agent, or Firm* — Pauley Petersen & Erickson

(57) ABSTRACT

The invention relates to a method for monitoring and/or controlling a transport device (10) wherein a plurality of similar products (17), in particular printed products, such as newspapers, magazines or similar are held in a detachable manner by means of individual clamps (12) that are arranged in a row, one behind the other, and are transported in sequence along a transport path (19). Improved operational reliability and controllability is characterized in that a contract-free read-in or read-out tag (T1-T5, Tn) is provided on the clamps (12), and that a reading-in/reading-out device (30) is disposed in the vicinity of the respective clamp for reading-in or reading-out data in the tags of a clamp (12), and is displaced with the respective clamp (12) over a selected section of the transport path (19).

26 Claims, 6 Drawing Sheets

U.S. PATENT DOCUMENTS

| | | | |
|---|---|---|---|
| 2007/0252719 A1* | 11/2007 | Ray | 340/679 |
| 2008/0164185 A1* | 7/2008 | Stemmle | 209/584 |
| 2009/0014520 A1* | 1/2009 | Kofman et al. | 235/439 |

FOREIGN PATENT DOCUMENTS

| | | |
|---|---|---|
| EP | 0 550 828 A1 | 7/1993 |
| EP | 0 606 550 A1 | 7/1994 |
| EP | 0 647 582 A1 | 4/1995 |
| EP | 0 686 592 A1 | 12/1995 |
| EP | 0 824 245 A1 | 2/1998 |
| EP | 918 721 B1 | 9/2001 |
| EP | 0 897 887 B1 | 4/2002 |
| EP | 0 961 188 B1 | 4/2003 |
| EP | 1 275 607 B1 | 9/2004 |
| WO | WO 2005/107948 A2 | 11/2005 |
| WO | WO 2006/063125 A2 | 6/2006 |
| WO | WO 2007/012206 | 2/2007 |

* cited by examiner

METHOD FOR MONITORING AND/OR CONTROLLING A TRANSPORT DEVICE, TRANSPORT DEVICE FOR CARRYING OUT SAID METHOD AND CLAMP FOR DETACHABLY HOLDING AND TRANSPORTING

BACKGROUND OF THE INVENTION

1. Field of the Invention

The present invention relates to the field of conveying technology. It relates to a method for monitoring and/or controlling a transportation apparatus in accordance with the preamble of claim 1, to a transportation apparatus for carrying out the method in accordance with the preamble of claim 11, and to a clamp for detachably holding and transporting in accordance with the preamble of claim 21.

2. Discussion of Related Art

During the production of printed products such as newspapers, magazines, catalogues, brochures or the like, which need to be provided quickly and in large quantities, special handling and processing techniques and techniques of transportation between the individual handling and processing stations have been developed and become established in the past which are distinguished particularly by the high achievable capacities of 40 000 or even 80 000 copies per hour.

Examples of such techniques are known from the documents DE-A1-196 23 307, EP-A1-0 518 064, EP-A1-0 550 828, EP-A1-0 606 550, EP-A1-0 647 582, EP-A1-0 686 592, EP-A1-0 824 245, EP-B1-0 918 721, EP-0 961 188, WO-A1-2007/012206.

The flat printed products, which are handled by pleating, folding, stapling, placing inserts, inserting, sticking, conveying, cutting, gathering, for example, are transported in between the individual handling stations continuously at a suitable, often relatively high speed, usually in the form of an overlapped stream or in a manner held individually by clamps or grippers, are buffer-stored for gathering devices, for example, or are separated and channeled off.

It is often necessary to convey complex products and products with a large number of pages, that is to say thick products. The clamps used for conveying are subject to extreme loads at the high conveying capacities, given the clamping forces required for holding thick products, and given the closing and opening movements which frequently occur, so that faults may occasionally occur which are caused by a malfunction or permanent damage to a clamp or to a clamp portion. In the event of such a fault, it is necessary to establish as quickly as possible which clamp or clamps is (are) the cause of the fault in order to keep costly interruption times as short as possible and to allow rapid repair or correction of the fault.

Furthermore, on account of their high load in operation and their desired high operational reliability, the clamps are technologically demanding products which are made up from a multiplicity of accurately matched clamp portions whose interaction ensures the necessary reliability of the mechanics. It is therefore desirable for, in the event of a fault, a faulty clamp portion of a clamp to be replaced by a spare which, in terms of its manufacturing conditions, accurately matches the respective clamp and meets the high demands on the mechanical and other properties.

From the field of meat processing, it is known practice (U.S. Pat. No. 7,159,772 B2) to equip the carriages in a transportation system for carcasses with RF tags in order to achieve explicit storable and readable association between the respective carriage and the carcass hanging thereon. A comparable proposal is also made in U.S. Pat. No. 6,452,497 B1. On account of the large distances between the individual carriages (hooks) and the low transportation speeds owing to the size and weight of the carcasses, it is in this case possible for the tags to be read in and out without any problems at a static location.

It is also known practice to equip paper rolls (US-A1-2004/0102870) or printed product rolls (EP-A1-0 824 245) with an RFID (Radio Frequency Identification) element in order to mark the respective product and render it identifiable. In this case too, the transported product is in the foreground of the data transmission.

Finally, it is known practice (U.S. Pat. No. 7,118,029 B2) to render a container for surgical instruments and the content of the container identifiable by virtue of both container and the instruments themselves having RFID tags fitted which can be read directly or indirectly.

SUMMARY OF THE INVENTION

It is an object of the invention to specify a method for monitoring and/or controlling a transportation apparatus operating with clamps and also a transportation apparatus of this kind which avoid the drawbacks of known methods and apparatuses and, in particular, are distinguished by a high level of operational reliability, reduced down times and flexible control and can be integrated into existing systems using the apparatuses which are present therein, and also to specify an appropriate clamp for detachably holding and transporting.

The object is achieved by all of the features of claims 1, 11 and 21. The essence of the invention is to provide tags which can be read in and/or out contactlessly on the clamps and, for the purpose of reading in and/or out prescribed volumes of data in the tags on a clamp, to bring a read in/out apparatus close to the respective clamp and to move it along with the respective clamp over a selected section of the transportation path. This makes it possible, despite the high linear speeds of the clamps during operation, not only to explicitly identify the clamp but also to establish and document its previous history, operational data and its partial or complete failure at any time. It is thus firstly possible to ensure that the correct spares are fitted when repairing the clamp following a failure. In addition, in the event of a fault, it is immediately possible to identify the clamp which has caused the interruption and, following a repair, to start up the installation again at the point at which it stopped. Finally, the individualization of the clamps can advantageously be used to control the installation when, by way of example, particular clamps with particular products need to be channeled off (transferred out) from the continuous row of clamps and supplied to separate handling operations. In this case, the identity of the clamps is continually checked and the channeling off operation initiated when the desired clamp has reached the channeling off point. Accordingly, the channeled off clamp with the separately handled product can later be inserted (channeled in) into the product stream again at a predetermined location.

Preferably, in line with one refinement of the invention, the tags used are tags which can be read in and/or out by radio, particularly in the form of RFIDs. In this case, the read in/out apparatus is in a form such and/or is moved along such that the respective tag(s) on a clamp can be read in and/or out undisturbed by the adjacent clamps. Such crosstalk between a plurality of clamps can be prevented by virtue of the antenna of the read in/out apparatus being brought sufficiently close to the tag on the desired clamp and at the same time being held sufficiently far away from the adjacent clamps. Alternatively, it is possible to take shielding measures or similar precautions in order to provide the antennas involved with a directional characteristic which is selective in terms of the desired clamp.

The read in/out apparatus can be moved along in different ways: it is thus conceivable for the read in/out apparatus to be moved along with the respective clamp on a parallel trajectory over the selected section of the transportation path. This achieves constant distance ratios between the clamp and the read in/out apparatus over the length of the selected section which are to the benefit of the radio links.

It is alternatively conceivable for the read in/out apparatus to be moved along with the respective clamp on an essentially arcuate trajectory over the selected section of the transportation path, said transportation path having an approximately tangential profile with respect to said trajectory. This refinement is particularly suitable when the read in/out apparatus advantageously needs to be integrated into a handling or processing station which executes a circular motion interlocked with the transport apparatus, as is known from EP-B1-1 275 607 or EP-B1-0 897 887 or EP-A1-0 550 828, for example.

Another refinement of the invention is characterized in that a limited number of read in/out apparatuses are used, and in that the limited number of read in/out apparatus are moved in a closed-end revolution such that the tags on each clamp can be read in and/or out in the selected section of the transportation path. This allows a high read in/out frequency to be achieved with simultaneously limited apparatus complexity.

If the clamps respectively comprise a plurality of separate clamp portions, it is advantageous if (at least the important) clamp portions are respectively provided with at least one tag and if a plurality of the tags arranged on the clamp portions are read in and/or out on the selected section of the transportation path. In this way, it is possible to check whether the clamps are made up from the respective matched portions and/or whether individual portions of the clamps are defective.

The access to the tags takes a particularly simple form if, in accordance with another refinement, for the purpose of reading in and/or out the tags arranged on the clamp portions a selected tag is accessed externally, and the data in the other tags are read in and/or out via the selected tag.

The tags can be used to store data and/or information for the widest variety of purposes. In particular, the tags on a clamp can be used to store and/or read out data for individualizing or identifying the clamp or the clamp portions.

Advantageously, the tags on a clamp can be used to store data about the type and/or manufacture and/or period of use or useful life of the clamp or clamp portions.

The tags can alternatively be used for monitoring the state of the clamps, and the discovery of malfunctions in the clamp or defective or incorrect clamp portions on the clamp prompts production of an appropriate report. In advantageous embodiments, the tags, particularly antennas thereof, are in a form such that they allow contactless establishment of whether the clamp is open or closed or whether or not there is a product in the closed clamp. This functionality for monitoring the open, closed and fill state can be achieved, by way of example, by virtue of components of the antenna being distributed over a plurality of interacting portions of the clamp such that when an empty clamp is closed, a closed antenna loop of a first length, when a filled clamp is closed, an antenna loop of a second length, and when a clamp is open, an antenna loop of a third length, is formed which are respectively able to be distinguished from one another by suitable readers.

One refinement of the transportation apparatus according to the invention is distinguished in that the tags are tags which can be read in and/or out by radio, particularly in the form of RFIDs, and that the read in/out apparatus is in the form and/or can be moved along with the clamps such that the respective tag(s) on a clamp can be read in and/or out undisturbed by the adjacent clamps.

In this case, the at least one read in/out apparatus is preferably moved along with the respective clamp on a parallel trajectory within the transmission apparatus over the selected section of the transportation path, or is brought near to said clamp over a section of the transportation path. The actual trajectory does not need to be linear in this case, but rather may follow a multiplicity of routes in the space which are essentially restricted only by the restrictions regarding the radii of curvature for the known conveying devices. What is important is that the elements provided for interaction are brought near to one another and, when a short distance apart or in direct contact, are brought into a narrow spatial context for a particular time.

Alternatively, the at least one read in/out apparatus is moved along with the respective clamp on an essentially arcuate trajectory within the transmission apparatus over the selected section of the transportation path, said transportation path having an approximately tangential profile with respect to said trajectory.

Another refinement of the transportation apparatus according to the invention is characterized in that the transmission apparatus comprises a plurality of read in/out apparatuses, and in that the read in/out apparatuses are moved in a closed-ended revolution such that the tags on each clamp can be read in and/or out in the selected section of the transportation path.

A further refinement of the transportation apparatus according to the invention is characterized in that the clamps respectively comprise a plurality of separate clamp portions, and in that the clamp portions are respectively provided with at least one tag, wherein particularly the tags arranged on the clamp portions can interchange data with one another.

Another refinement of the transportation apparatus according to the invention is characterized in that the tags on a clamp store data for individualizing or identifying the clamps or the clamp portions, wherein particularly the tags on a clamp store data about the type and/or manufacture and/or period of use or useful life of the clamp or clamp portions.

It is particularly beneficial if the transmission apparatus in the transportation apparatus according to the invention is part of a handling apparatus which interacts with the transportation apparatus for the purpose of handling the transported products.

One refinement of the clamp according to the invention is characterized in that the clamp respectively comprises a plurality of separate clamp portions, and in that a plurality of the clamp portions are respectively provided with at least one tag, wherein the tags are tags which can be read in and/or out by radio, particularly in the form of RFIDs, at least one selected instance of the tags can be read in and/or out externally, and other tags can be read in and/or out only via the selected tag.

Another refinement of the clamp is distinguished in that the clamp at least partially comprises plastic, and in that tags are embedded in the plastic.

A further refinement is characterized in that the tags on the clamp store data for individualizing or identifying the clamp or the clamp portions and/or data about the type and/or manufacture and/or period of use or useful life of the clamp or clamp portions.

BRIEF DESCRIPTION OF THE DRAWINGS

The invention will be explained in more detail below using exemplary embodiments in conjunction with the drawing, in which.

DETAILED DESCRIPTION OF THE INVENTION

Figure 1:
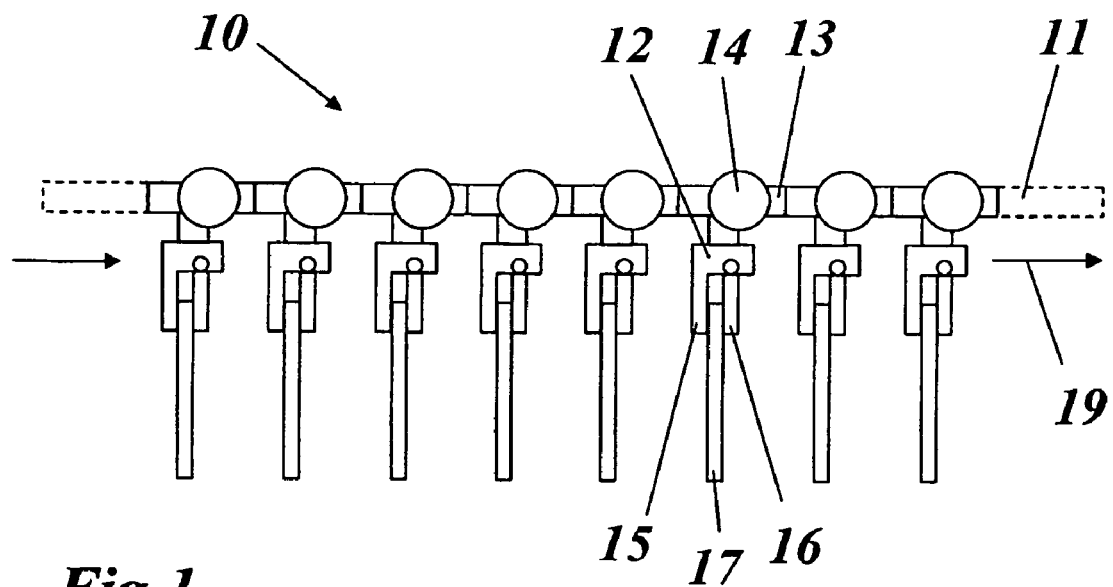
FIG. 1 shows a highly simplified detail from a first transportation apparatus for printed products such as newspapers or the like, in which a multiplicity of clamps for holding the products are combined to form a continuous transportation chain and which is particularly suitable for the application of the invention.

FIG. 1 shows a highly simplified detail from a first transportation apparatus for printed products, such as newspapers or the like, which is suitable for implementing the invention and in which a multiplicity of clamps for holding the products are combined to form a continuous transportation chain. The transportation apparatus 10 in FIG. 1 comprises a multiplicity of clamps 12 which respectively have two jaws 15 and 16 which can be opened for the purpose of gripping and holding the flat products 17 and closed in the manner of forceps. Each of the clamps 12 is mounted on a clamp support 13 which is provided with casters 14. The clamp support 13 with the clamps 12 mounted thereon are arranged in succession to one another and form a transportation chain 11 which runs along a transportation path 19 which, in the example in FIG. 1, has a horizontal and straight profile, but may also have a curved or vertical profile or, as already mentioned above, a profile along another desired route in the space. The products (printed products, particularly newspapers) 17 are transported in suspension in FIG. 1, but may also be supported on top of the transportation chain if the transportation chain passes through a closed-ended revolution and is returned in the opposite direction with the clamps 12 on the top.

Figure 2:
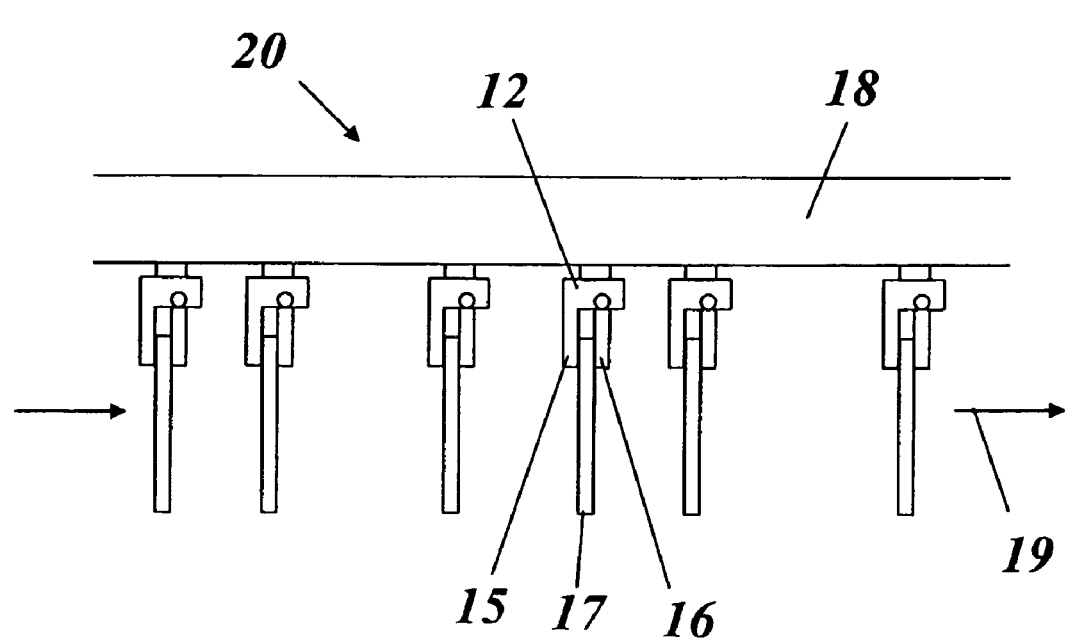
FIG. 2 shows a highly simplified detail from a second transportation apparatus for printed products such as newspapers or the like, in which a multiplicity of clamps for holding the products are arranged so as to be able to be moved with alterable spacing in a rail and which is particularly suitable for the application of the invention.

Another suitable transportation apparatus for the implementation of the invention is shown in FIG. 2. The transportation apparatus 20 in FIG. 2 likewise comprises the clamps 12 with the jaws 15 and 16. In this case, however, the clamps 12 run in a transportation rail 18 and can assume different, alterable spacings from one another.

Figure 3:
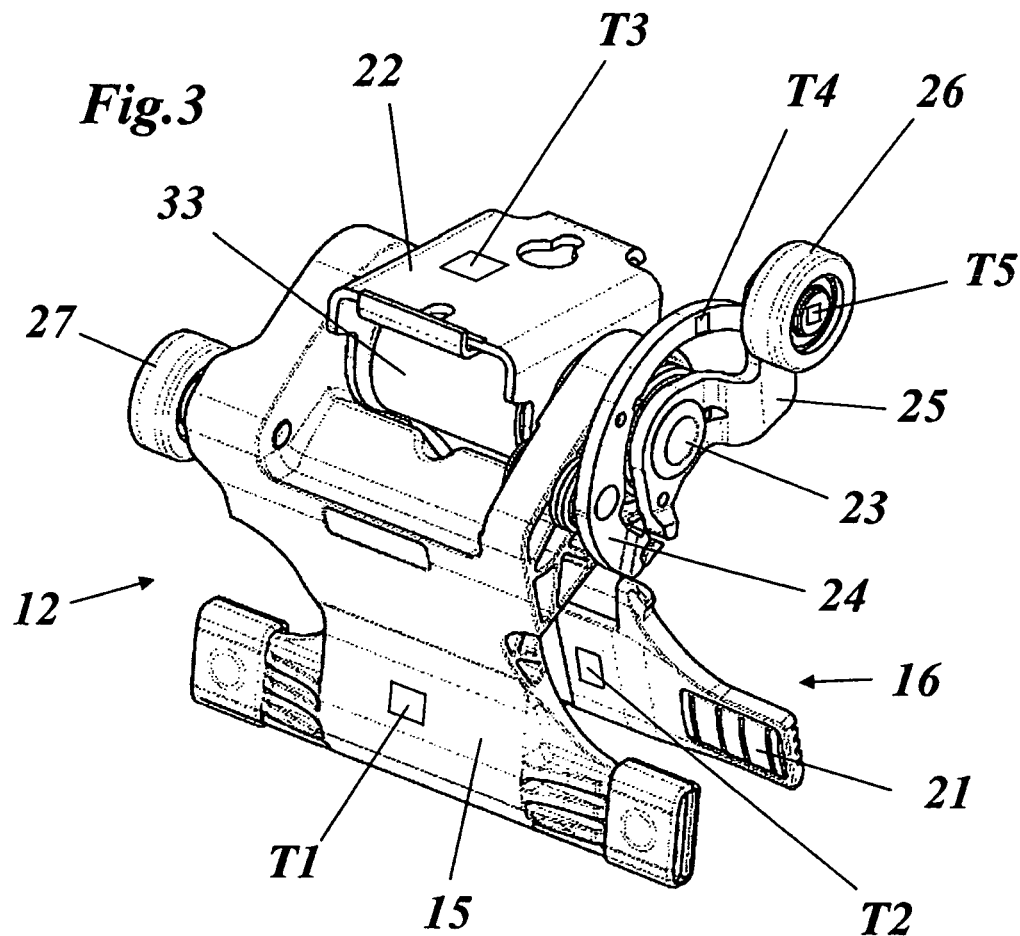
FIG. 3 shows a perspective side view of an inherently known example of a clamp, as used in the apparatuses shown in FIG. 1 or 2, with various tags which are fitted on the clamp and which can be read in and/or out wirelessly.

The individual clamp 12 may be designed as shown in FIG. 3, for example: the clamp 12 is made up of a plurality of individual clamp portions, namely the two jaws 15, 16, a stirrup 22, a pivot axle 23, a ratchet lever 24, an actuating arm 25 and two guide rollers 26, 27. One jaw 15 is in the form of a plastic injection molded part. Its lower end merges into a crossmember. At the upper end, a pivot axle 23 oriented parallel to the crossmember is inserted in the jaw 15. The other jaw 16 comprises a second cross member 21, which is opposite the first crossmember of the jaw 15. The second crossmember 21 is mounted on the free end of a flat spring 33 which is routed upward to the pivot axle 23 and is wound around the pivot axle 23 a plurality of times. When the pivot axle 23 is rotated in order to close the second jaw 16, the flat spring 33 is tensioned like a helical spring and pushes the second crossmember 21 resiliently against the first crossmember of the first jaw 15. The pivot axle 23 is caused to rotate by an applied actuating arm 25, one end of which has a guide roller 26 rotatably mounted on it for the purpose of sensing a guide link fitted on the transportation apparatus. The other end of the actuating arm 25 is blocked by a ratchet lever 24 when the clamp is closed. When the ratchet lever 24 is released, the actuating arm 25 pretensioned by a spring pivots in the direction of opening and the clamp 12 releases the product. The stirrup 22, which—like the parts 24 and 25—comprises metal, is pivotably mounted on the pivot axle 23.

It is self-evident that the clamp 12 shown in FIG. 3 and its individual clamp portions are subject to high mechanical loads during the rapid transportation and also closing and opening operations. It is therefore a possibility that the jaw 15 might break or that the ratchet lever 24 snaps off or that the guide rollers 26, 27 wear or break.

To prevent such incidents as far as possible or to make them improbable, it is advantageous to equip the clamp 12 itself and also its individual clamp portions with tags T1, . . . , T5 which can be read in and/or out and which can be read contactlessly or can have new data written to them contactlessly. In this case, a first set of data can be used to identify the clamp 12 as such, so that all the clamps 12 in the transportation apparatus 10 or 20 can be addressed and identified individually. This makes it possible, when the transportation apparatus 10, 20 is controlled, for each clamp 12 to be addressed individually and to be routed from one handling station to the next individually within the system. Furthermore, it is possible for each clamp 12 to have its individual manufacturing parameters, its "life" and its operating time associated with it.

These individualized data records are not limited to the level of the clamp, but rather can advantageously be used at the lower level of the clamp portions too. In this case, every important clamp portion has its own associated tag with its own data record and "life", so that there is the assurance that the clamp is always formed from the correct, optimally matched clamp portions. This is particularly important when, following a breakdown, a clamp needs to be repaired and one or more clamp portions need to be replaced. It is then possible to check in the installation whether correct spares have been used, and corrective measures can be taken if appropriate.

However, the tags T1, . . . , T5 on the clamp 12 can also be used to store data which relate to the currently transported product or the product which is to be transported, so that there is no need for readable marking of the product itself. The clamps 12 can thus be used to separate particular products on a specific basis and to compile them at a different location to form a new group in order to meet particular customer requirements. If transported newspapers are provided with individual address stickers at one location in the transportation apparatus 10, 20, for example, the relevant address information can simultaneously be stored in the tags T1, . . . , T5 on the carrying clamp 12, so that, by reading the clamps 12, newspapers for particular zip code zones can be separated and combined into a separate group at another location.

Alternatively, the tags T1, . . . , T5 residing at the level of the clamp portions can be used to monitor the operability of individual clamp portions. If the long arm of the ratchet lever 24, for example, breaks off close to the center of rotation in FIG. 3, the tag T4 is no longer present on the clamp 12, which means that interrogating it does not provide a result. In this case, it is possible to output an appropriate error report which signals a fault on the ratchet lever 24.

Figure 4:
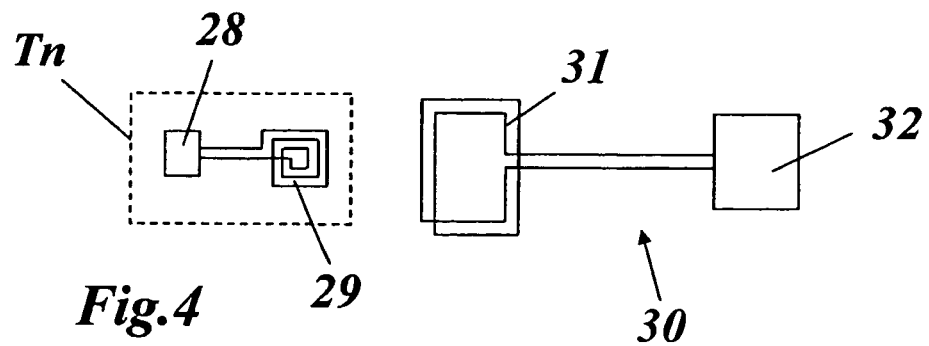
FIG. 4 shows the schematic arrangement of one of the tags shown in FIG. 3 and the associated read in/out apparatus.

The tags T1, . . . , T5 are preferably in the form of RFID tags and are designed as shown in FIG. 4 with the example of the tag Tn, which comprises an (active or passive) electronic circuit 28 to which an antenna 29 for sending and/or receiving is connected. The tags T1, . . . , T5; Tn may be fitted to the clamp 12 or to the individual clamp portions in different ways. They should be firmly connected to the portion and be sufficiently protected against encumbering environmental influences of a mechanical, thermal or chemical nature. Metal portions can be bonded on and provided with a protective coating. Plastic injection molded portions can be embedded or overmolded.

The arrangement of the tags T1, . . . , T5; Tn on the clamp or the clamp portions additionally needs to ensure sufficient access by a read in/out apparatus 30 (FIG. 4), which in the simplest case comprises an antenna 31 and a control unit or transmission/reception unit 32. Under confined space conditions, it is expedient only to bring the antenna 31 close to the tag which is to be read, while the connected control unit 32 can be positioned a long distance away.

Figure 9:
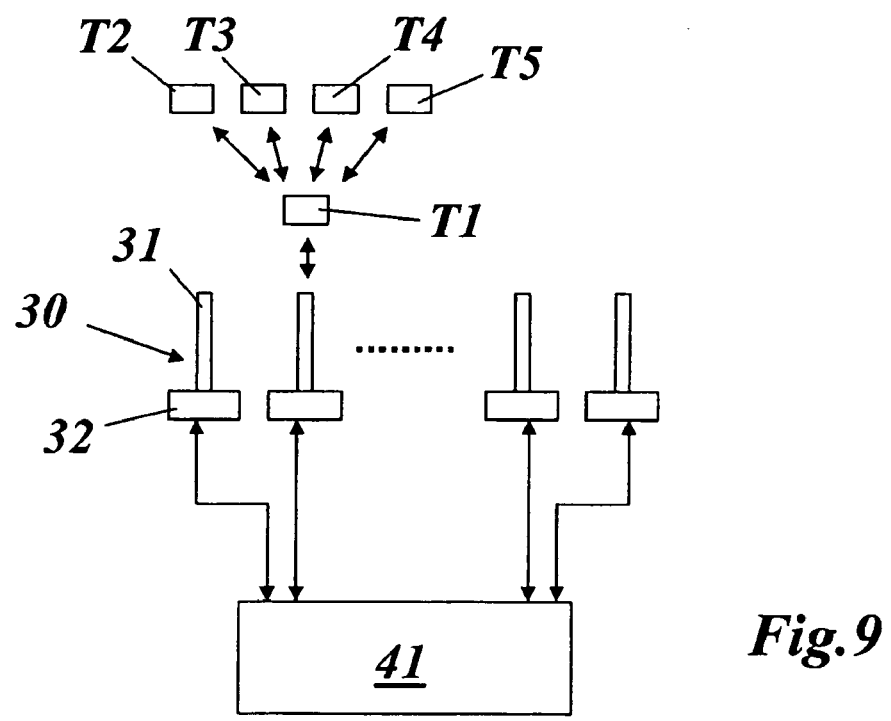
FIG. 9 shows a highly simplified schematic of the circuit arrangement as may be used by way of example within the transmission apparatuses shown in FIGS. 5 to 8.

In principle, it is conceivable for all the tags T1, . . . , T5 on a clamp 12 to be addressed individually by the read in/out apparatus 30. However, this requires a high level of complexity in terms of accessibility and selectivity. It is therefore expedient if, as shown in FIG. 9, only one tag T1 is addressed externally, which tag communicates within the clamp 12 directly with the other tags T2, . . . , T5 on the clamp portions and reads in and/or out the data therein. The data going to the read in/out apparatuses 30 and/or coming from the read in/out apparatuses 30 are generated and/or processed in a central unit 41 and used in the overall system for control or monitoring.

A fundamental aspect of the communication between the tags T1, . . . , T5 and the read in/out apparatus 30 is that the read in/out apparatus 30 is brought close to the respective clamp to be addressed and is moved along with said clamp over a selected section of the transportation path 19 for said clamp. This enlarges the time window in which a suitable radio link for secure data interchange between tag and read in/out apparatus 30 exists between the two without making the disturbing influences of directly adjacent clamps noticeable.

Figure 5:
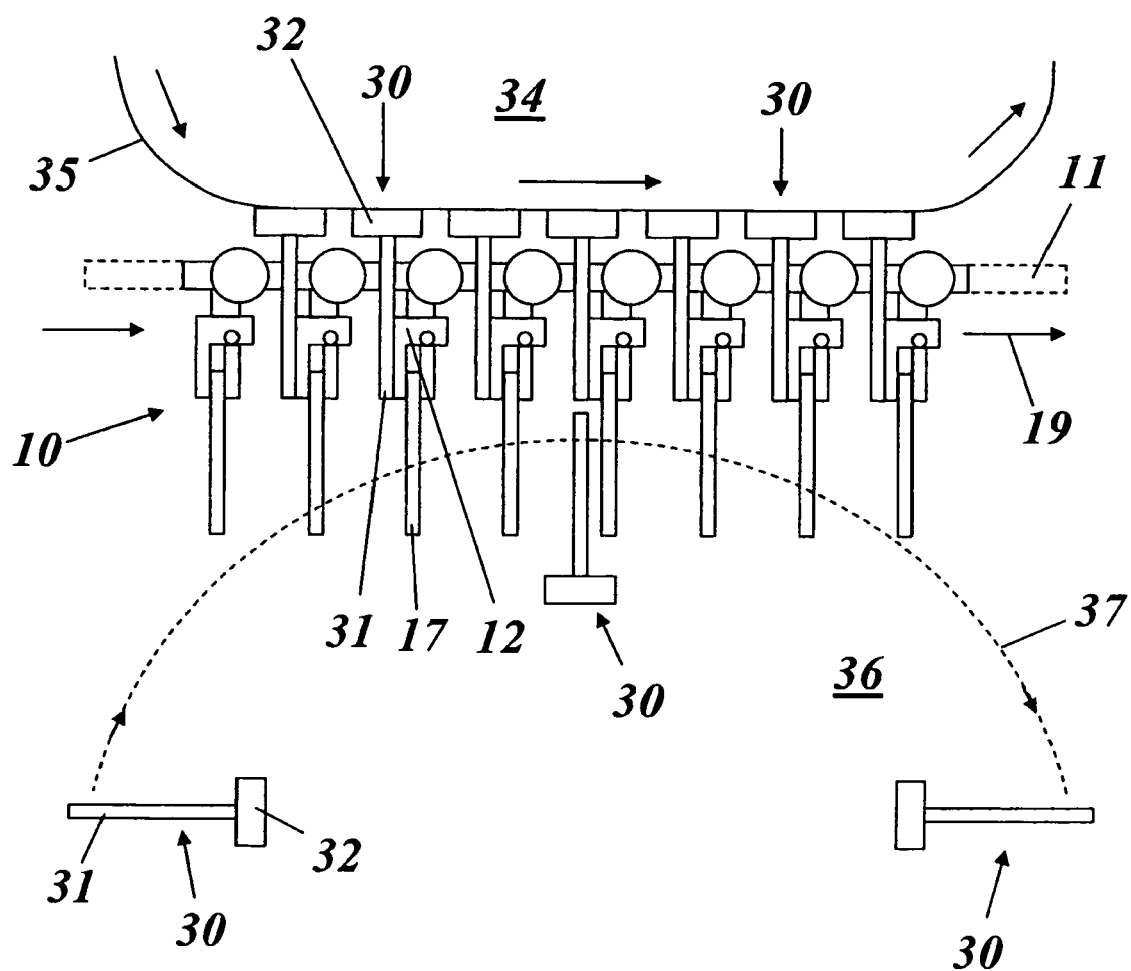
FIG. 5 shows a side view of two exemplary embodiments of transmission apparatuses according to the invention which, in combing interaction from above or below with a transportation apparatus as shown in FIG. 1, allow the tags fitted on the clamps to be read in and/or out during operation.

As shown in FIG. 5 (top part), an enlarged time window of this kind can be achieved by virtue of the read in/out apparatus 30, which is shown schematically in FIG. 5 and the subsequent figures as comprising an elongate antenna 31 and a control unit 32 arranged at one end, being moved along with the respective clamp 12 on a parallel trajectory over the selected section of the transportation path 19. In the example in FIG. 5 (top end), a transmission apparatus 34 is provided for this purpose, within which a multiplicity of read in/out apparatuses 30 are moved on a closed-ended trajectory 35 which runs over a certain distance parallel to the transportation path 19 of the transportation apparatus. The read in/out apparatuses 30 engage in the conveying stream of the transportation apparatus 10 over this distance such that the active end of the antenna 31 comes to rest directly against the jaw 15 of the clamp 12 which is provided with the tag T1, and can selectively connect to this tag. In this case, each clamp has a respective associated read in/out apparatus 30 over this distance. The parallel guidance of the tracks 19 and 35 means that the coupling conditions between the read in/out apparatus 30 and the tag remain constant over a relatively long distance, which is particularly beneficial for the data transmission.

It is alternatively conceivable and particularly important for practical operation if—as shown in FIG. 5 (bottom)—the read in/out apparatuses 30 are moved along with the respective clamp 12 on an essentially arcuate trajectory 37 over the selected section of the transportation path 19, said transportation path 19 having an approximately tangential profile with respect to said trajectory. This type of ("gearwheel-like") engagement of the read in/out apparatuses 30 in the transportation chain can easily be implemented by virtue of the read in/out apparatuses 30 being integrated into already present handling stations which engage in the transportation apparatus 10, 20 with a circular trajectory, as known from EP-B1-1 275 607 or EP-B1-0 897 887 or EP-A1-0 550 828, for example. In this case, the engagement can be effected from the side of the clamps 12, as shown for the trajectory 37 at the bottom of FIG. 5. Alternatively, it can be effected from the opposite side (in FIG. 5 the trajectory 35 is then replaced by the trajectory 37).

Figure 6:
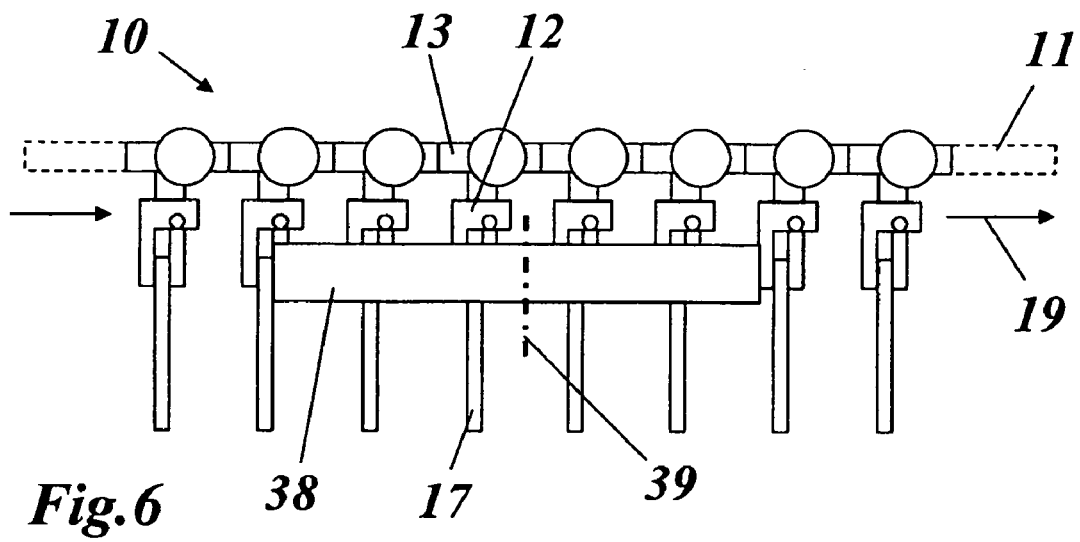
FIG. 6 shows a side view of a further exemplary embodiment of a transmission apparatus according to the invention which, in combing interaction from the side with a transportation apparatus as shown in FIG. 1, allows the tags fitted on the clamps to be read in and/or out during operation.
Figure 7:
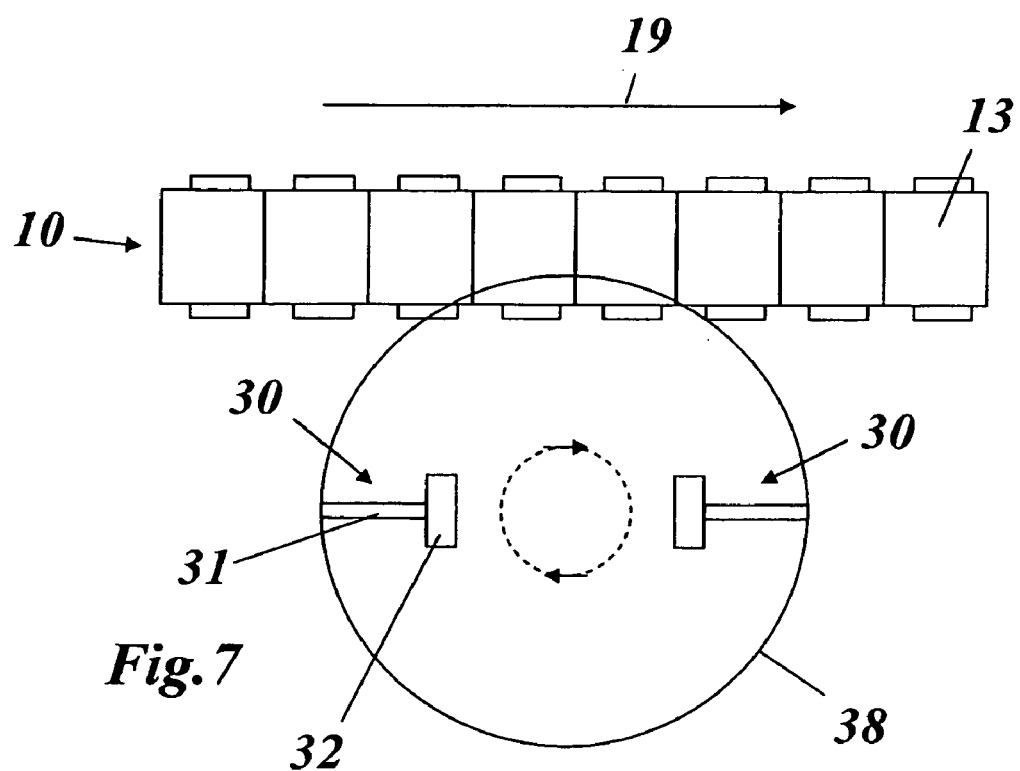
FIG. 7 shows the apparatus from FIG. 6 in a plan view from above.

Another option involves engaging in the transportation apparatus 10 from the side with a transmission apparatus 38 with a circular trajectory for the read in/out apparatuses 30 around a vertical axis of rotation 39, as shown in FIGS. 6 and 7. In all cases, only a few read in/out apparatuses 30 are shown by way of example in order to clarify the movement thereof in principle.

Figure 8:
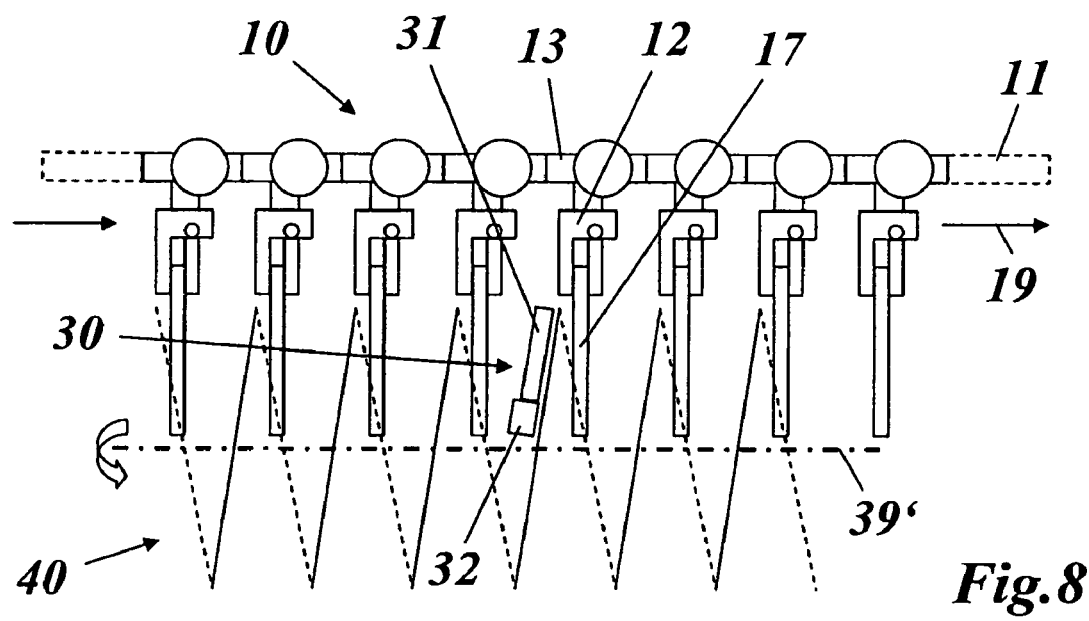
FIG. 8 shows a side view of another exemplary embodiment of a transmission apparatus according to the invention which, in helically combing interaction from below with a transportation apparatus as shown in FIG. 1, allows the tags fitted on the clamps to be read in and/or out during operation.

Alternatively, it is conceivable to make the read in/out apparatuses 30 move along by virtue of their being arranged in a transmission apparatus 40, as shown in FIG. 8, which engages with the transportation apparatus 10 helicoidally in rotation around an axis of rotation 39' which is parallel to the transportation path.

Figure 10:
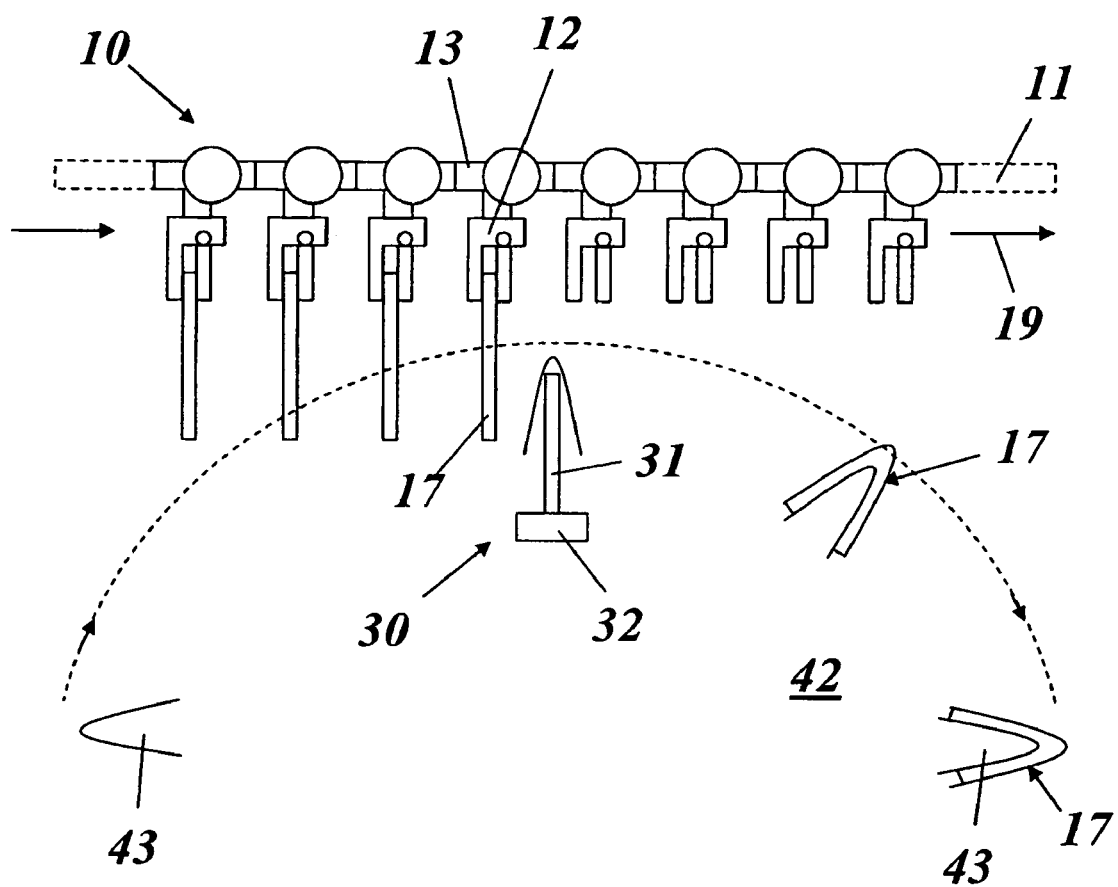
FIG. 10 shows a side view of a further exemplary embodiment of a transmission apparatus according to the invention which is based on an available processing drum and, in combing interaction from the side with the transportation apparatus as shown in FIG. 1, allows the tags fitted on the clamps to be read in and/or out during operation.

A particular type of implementation is obtained if the transportation apparatus 10 interacts with a processing drum 42 (FIG. 10) which contains saddle-shaped supports 43 which are arranged distributed over a circumference and on which the products 17 held by the clamps are deposited. In this case, each of the saddle-shaped supports 43 can be assigned a read in/out apparatus 30 which makes connection with the respective clamp in the course of the combing engagement of the processing drum 42 with the transportation apparatus 10.

In further preferred embodiments, which are not shown in the figures, the trajectories of the read in/out apparatus are matched to one another at least over a section of a nonlinear conveying path. Thus, by way of example, a transportation path can be adjusted over a selected section of a, by way of example, arcuate trajectory of read in/out apparatuses, so that the transportation apparatus likewise has an arcuate profile in this area. Alternatively, the trajectory of read in/out apparatuses can be routed in an arc shape, matched to a circular or arcuate profile of a transportation path. This basic principle of reciprocal matching in the route is not limited to the arcuate shape, but rather can be implemented for any routes in the space.

Although the present description describes the invention with reference to clamp transporters, it is clear to a person skilled in the art that the inventive concept can be transferred in full to pocket or ladder conveyors.

The invention claimed is:

1. A method for monitoring and/or controlling a high-speed transportation apparatus (10, 20) in which a multiplicity of like products (17), particularly printed products such as newspapers or magazines, are held detachably by means of individual clamps (12) arranged in a succession to one another and are transported along a transportation path (19) in succession, the method comprising:
   transporting the clamps (12) along a continuous transport chain (11) defining the transportation path (19);
   providing each of the clamps with at least one readable tag (T1, ..., T5; Tn);
   bringing an element of a read in/out apparatus (30) within the transport path (19) and adjacent to a corresponding one of the clamps for the purpose of reading in and/or out prescribed volumes of data in the at least one tag (T1, ..., T5; Tn) on the corresponding one of the clamps (12); and
   moving the element of the read in/out apparatus (3) within the transport path (19) along with the corresponding one of the clamps (12) over a selected section of the transport path (19).

2. The method as claimed in claim 1, wherein the tags used are tags (T1, ..., T5; Tn) which can be read in and/or out by radio, particularly in the form of RFIDs, and in that the read in/out apparatus (30) is in a form and/or moved along such that the respective tag(s) (T1, ..., T5; Tn) on a clamp can be read in and/or out undisturbed by the adjacent clamps.

3. The method as claimed in claim 1 further comprising:
   matching a trajectory for read in/out apparatuses with a profile for a transportation path over the selected section of the transportation path, wherein the read in/out apparatus (30) is moved along with the respective clamp (12) on a parallel trajectory (35) over the selected section of the transportation path (19).

4. The method as claimed in claim 1 wherein the read in/out apparatus (30) is moved along with the respective clamp (12) on an essentially arcuate trajectory (37) over the selected section of the transportation path (19), said transportation path (19) having an approximately tangential profile with respect to said trajectory.

5. The method as claimed in claim 1 wherein a limited number of read in/out apparatuses (30) are used, and in that the limited number of read in/out apparatuses (30) are moved in a closed-end revolution such that the tags (T1, ..., T5; Tn) on each clamp (12) can be read in and/or out in the selected section of the transportation path (19).

6. The method as claimed in claim 1 wherein the clamps (12) respectively comprise a plurality of separate clamp portions (13, ..., 16; 21, ..., 27), in that the clamp portions (13, ..., 16; 21, ..., 27) are respectively provided with at least one tag (T1, ..., T5; Tn), and in that a plurality of the tags (T1, ..., T5; Tn) arranged on the clamp portions (13, ..., 16; 21, ..., 27) are read in and/or out on the selected section of the transportation path (19).

7. The method as claimed in claim 6, further comprising:
   externally accessing a selected tag (T1) for the purpose of reading in and/or out the tags (T1, ..., T5; Tn) arranged on the clamp portions (13, ..., 16; 21, ..., 27), and in that the data in the other tags (T2, ..., T5) are read in and/or out via the selected tag (T1).

8. The method as claimed in claim 1 wherein the tags (T1, ..., T5; Tn) on a clamp (12) are used to store and/or read out data for individualizing or identifying the clamp (12) or clamp portions (13, ..., 16; 21, ..., 27).

9. The method as claimed in claim 8, wherein the tags (T1, ..., T5; Tn) on a clamp (12) are used to store data about the type and/or manufacture and/or period of use or useful life of the clamp (12) or clamp portions (13, ..., 16; 21, ..., 27).

10. The method as claim in claim 1 wherein the tags (T1, ..., T5; Tn) are used to monitor the state of the clamps (12), and in that the discovery of malfunctions in the clamp (12) or defective or incorrect clamp portions (13, ..., 16; 21, ..., 27) on the clamp (12) prompts production of an appropriate report.

11. The method as claimed in claim 1 wherein the tags are used for monitoring the open, closed and fill state of the clamps (12).

12. A transportation apparatus (10, 20) for carrying out the method as claimed in claim 1, said transportation apparatus (10, 20) comprising:
   a multiplicity of the clamps (12) which can be moved along the transportation path (19) in an arrangement in succession to one another and are designed for detachably holding the like products (17), wherein the at least one tag (T1, ..., T5; Tn) which can be read in and/or out contactlessly is arranged on the each of the clamps (12), and in that for the purpose of reading in and/or out prescribed volumes of data in the tags (T1, ..., T5; Tn) on a clamp (12), a transmission apparatus (34, 36, 38, 40) which interacts with the transportation apparatus (10, 20) and the element of the read in/out apparatus (30) is brought adjacent to the respective clamp by means of the transmission apparatus (34, 36, 38, 40) and can be moved along with the corresponding one of the clamps (12) over the selected section of the transportation path (19).

13. The transportation apparatus as claimed in claim 12, wherein the tags are tags (T1, ..., T5; Tn) which can be read in and/or out by radio, particularly in the form of RFIDs, and in that the read in/out apparatus (30) is in a form and/or can be moved along with the clamps (12) such that the respective tag(s) (T1, ..., T5; Tn) on a clamp can be read in and/or out undisturbed by the adjacent clamps.

14. The transportation apparatus as claimed in claim 12 wherein a trajectory for read in/out apparatuses and a profile for the transportation path match one another over the selected section of the transportation path, wherein preferably the at least one read in/out apparatus (30) is moved along with the respective clamp (12) on a parallel trajectory (35) within the transmission apparatus (34) over the selected section of the transportation path (19).

15. The transportation apparatus as claimed in claim 12 wherein the at least one read in/out apparatus (30) is moved along with the respective clamp (12) on an essentially arcuate trajectory (37) within the transmission apparatus (36, 38) over the selected section of the transportation path (19), said transportation path (19) having an approximately tangential profile with respect to said trajectory.

16. The transportation apparatus as claimed in claim 12 wherein the transmission apparatus (34, 36, 38, 40) comprises a plurality of read in/out apparatuses (30), and in that the read in/out apparatuses (30) are moved in a closed-end revolution such that the tags (T1, . . . , T5; Tn) on each clamp (12) can be read in and/or out in the selected section of the transportation path (19).

17. The transportation apparatus as claimed in claim 12 wherein the clamps (12) respectively comprise a plurality of separate clamp portions (13, . . . , 16; 21, . . . , 27), and in that the clamp portions (13, . . . , 16; 21, . . . , 27) are respectively provided with at least one tag (T1, . . . , T5; Tn).

18. The transportation apparatus as claimed in claim 17 wherein the tags (T1, . . . , T5; Tn) arranged on the clamp portions (13, . . . , 16; 21, . . . , 27) can interchange data with one another.

19. The transportation apparatus as claimed in claim 12 wherein the tags (T1, . . . , T5; Tn) on a clamp (12) store data for individualizing or identifying the clamp (12) and/or clamp portions (13, . . . , 16; 21, . . . , 27).

20. The transportation apparatus as claimed in claim 19 wherein the tags (T1, . . . , T5; Tn) on a clamp (12) store data about the type and/or manufacture and/or period of use or useful life of the clamp (12) or clamp portions (13, . . . , 16; 21, . . . , 27).

21. The transportation apparatus as claimed in claim 12 wherein the transmission apparatus (34, 36, 38, 40) is part of a handling apparatus which interacts with the transportation apparatus (10, 20) for the purpose of handling the transported products (17).

22. A method for monitoring and/or controlling a transportation apparatus (10, 20) for a multiplicity of printed products, comprising:
transporting clamps (12) in which the printed products are detachably held in succession to one another along a continuous transport chain (11) defining a transportation path (19), each of the clamps including at least one readable tag (T1, . . . , T5; Tn);
moving an element of a read in/out apparatus (30) along a selected section of the transport path (19);
bringing the element of the read in/out apparatus (30) close to a corresponding one of the clamps (12), wherein the element of the read in/out apparatus (30) is moved into a position within the transport path (19) that is between the corresponding one of the clamps (12) and an adjacent one of the clamps (12); and
reading and/or out prescribed volumes of data to the tags (T1, . . . , T5; Tn) on the corresponding one of the clamps (12).

23. The method as claimed in claim 22, wherein the element of the read in/out apparatus (30) comprises an antenna.

24. The method as claimed in claim 22 wherein the read in/out apparatus (30) is moved along with the clamps (12) on an arcuate trajectory (37) that is adjacent the selected section of the transportation path (19), said transportation path (19) having an approximately tangential profile with respect to said trajectory.

25. The method as claimed in claim 22, further comprising:
bringing one of a plurality of elements of the read in/out apparatus (30) close to each of the clamps (12), wherein each of the elements of the read in/out apparatus (30) is moved into a position within the transport path (19) disposed between two adjacent clamps (12).

26. The method as claimed in claim 25 wherein the read in/out apparatus (30) is moved along with the clamps (12) on an arcuate trajectory (37) that is adjacent the selected section of the transportation path (19), said transportation path (19) having an approximately tangential profile with respect to said trajectory.

\* \* \* \* \*